United States Patent [19]

Kurohara et al.

[11] Patent Number: 5,207,187
[45] Date of Patent: May 4, 1993

[54] AIR COOLING SYSTEM FOR A VERTICAL ENGINE

[75] Inventors: Kazuaki Kurohara; Nobuyuki Yamashita; Masatake Murakawa, all of Sakai, Japan

[73] Assignee: Kubota Corporation, Osaka, Japan

[21] Appl. No.: 784,549

[22] Filed: Oct. 29, 1991

Related U.S. Application Data

[63] Continuation-in-part of Ser. No. 668,028, Mar. 12, 1991, Pat. No. 5,113,819.

[30] Foreign Application Priority Data

Oct. 30, 1990 [JP] Japan .................................. 2-294031

[51] Int. Cl.⁵ ............................................... F01P 1/02
[52] U.S. Cl. .................... 123/41.7; 180/68.1; 180/900
[58] Field of Search ............... 123/41.48, 41.56, 41.63, 123/41.65, 41.7, 198 E, 195 HC, 196 W; 180/68.1, 68.2, 291, 900

[56] References Cited

U.S. PATENT DOCUMENTS

| 4,432,309 | 2/1984 | Hutchison et al. | 123/41.66 |
| 4,862,981 | 9/1989 | Fujikawa et al. | 180/68.4 |
| 4,891,940 | 1/1990 | Tamba et al. | 60/320 |

Primary Examiner—Noah P. Kamen
Attorney, Agent, or Firm—Webb, Burden, Ziesenheim & Webb

[57] ABSTRACT

An air cooling system for a vertical engine having a cylinder head projecting forwardly of a vehicle. The vehicle also includes a steering box disposed rearwardly of the engine, and a hood extending from the steering box and over the engine. This cooling system includes a cooling fan disposed above the engine; and engine cover enclosing the engine and opening downwardly, the engine cover defining an air suction opening in a region opposed to the cooling fan; an air intake opening defined in the steering box; and a shield for dividing an engine room formed forwardly of the steering box and under the hood into a front chamber for accommodating the cylinder head, and a rear chamber for accommodating the cooling fan. The shield includes a first shield member and second shield members.

9 Claims, 3 Drawing Sheets

AIR COOLING SYSTEM FOR A VERTICAL ENGINE

This application is a continuation-in-part of Application Ser. No. 07/668,028, filed Mar. 12, 1991 now U.S. Pat. No. 5,113,819.

BACKGROUND OF THE INVENTION

1. Field of the Invention

The present invention relates to an air cooling system for a vertical engine having a cylinder head projecting forwardly of a vehicle, which vehicle includes the engine, a steering box disposed rearwardly of the engine, and a hood extending from the steering box and over the engine.

2. Description of the Related Art

This type of air cooling system for the engine is disclosed in U.S. Pat. No. 4,432,309, for example. In this air cooling system, a hood and a baffle defines an air passage between a steering box including an air intake opening defined in a rear wall thereof, and a cooling fan mounted above a vertical engine. The baffle includes a semicircular curved portion extending around the cooling fan, and legs extending tangentially from opposite ends of the curved portion to the steering box. With this construction, cooling air entering through the air intake opening flows to the cooling fan through an interior space of the steering box and through an inlet of the baffle defined by the hood and right and left baffle legs.

However, such a cooling system achieves only an insufficient amount of cooling air intake since cooling air is guided to a suction opening of the cooling fan through a narrow space surrounded by the hood and right and left baffle legs. This results in a poor engine cooling performance.

SUMMARY OF THE INVENTION

The present invention has been made having regard to the state of the art noted above, and its object is to provide an air cooling system for an engine which is capable of feeding a sufficient amount of cooling air to a suction opening of a cooling fan.

The above object is fulfilled, according to the present invention, by an air cooling system for an engine as noted in the introductory part hereof and comprising a cooling fan disposed above the engine; an air intake opening defined in the steering box; and a shield for dividing an engine room formed forwardly of the steering box and under the hood into a front chamber for accommodating the cylinder head, and a rear chamber for accommodating the cooling fan, the shield including a first shield member extending from an upper position of the engine to a lower surface of the hood, and second shield members connected to opposite ends of the first shield member and extending downwardly between the side walls of the engine and side surfaces of the hood, respectively.

The shield in the above system allows cooling air having passed through the steering box to be introduced from regions rearwardly of the engine and to flow along opposite sides of the engine to reach an air suction opening of the cooling fan above the engine. That is, since an air passage having a large space extends from the steering box to the cooling fan, a sufficient amount of cooling air is supplied to the engine. Further, the shield divides the engine room into a front chamber accommodating the hot cylinder head, and a rear chamber. The rear chamber serves also as an insulating space to isolate a region including the steering box from the heat of the cylinder head.

In a preferred embodiment of the present invention, the first shield member is fixed to the engine or engine cover. If the first shield member were fixed to the hood, the hood would have an increased weight, lending difficulty to opening and closing of the hood.

Other features and advantages of the present invention will be apparent from the following description of the preferred embodiment to be had with reference to the drawings.

DETAILED DESCRIPTION OF THE PREFERRED EMBODIMENT

Figure 1:
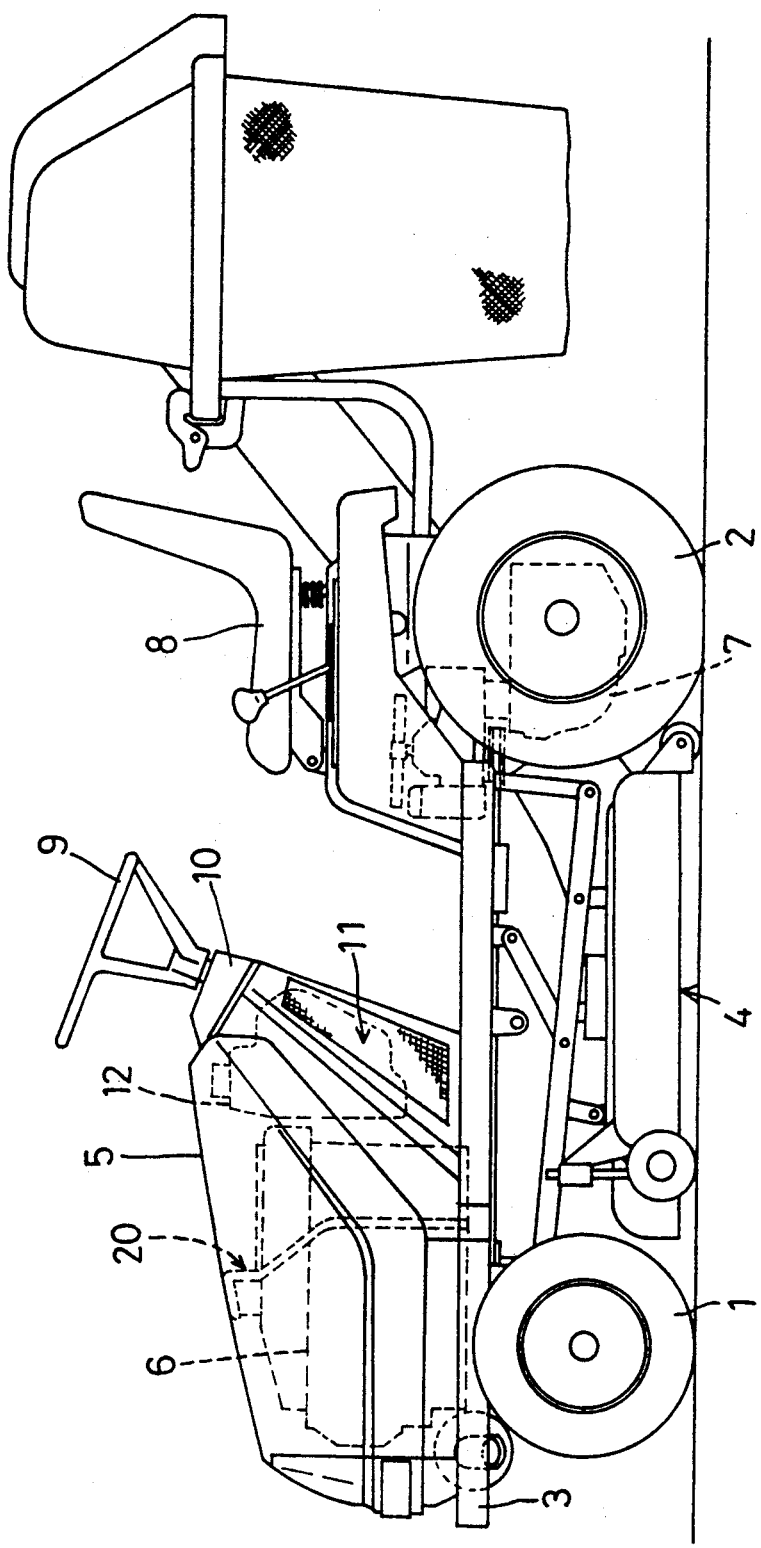
FIG. 1 is a side elevation of a riding lawn mower employing a cooling system according to the present invention.

FIG. 1 shows a riding lawn mower as one example of working vehicles employing an air cooling system according to the present invention.

This lawn mower has front wheels 1 and rear wheels 2 supporting a body frame 3. The body frame 3 carries a grass cutting unit 4 detachably connected to a lower middle position thereof, and an engine 6 mounted on a front position of the body frame 3 and covered by a hood 5. Power of the engine 6 is transmitted to the rear wheels 2 through a transmission 7. The body frame 3 further carries a driver's seat 8 mounted on a rear position thereof. A steering box 10 is mounted between the driver's seat 8 and engine 6, and connected to the hood 5. The steering box 10 includes a steering handle 9.

Figure 2:
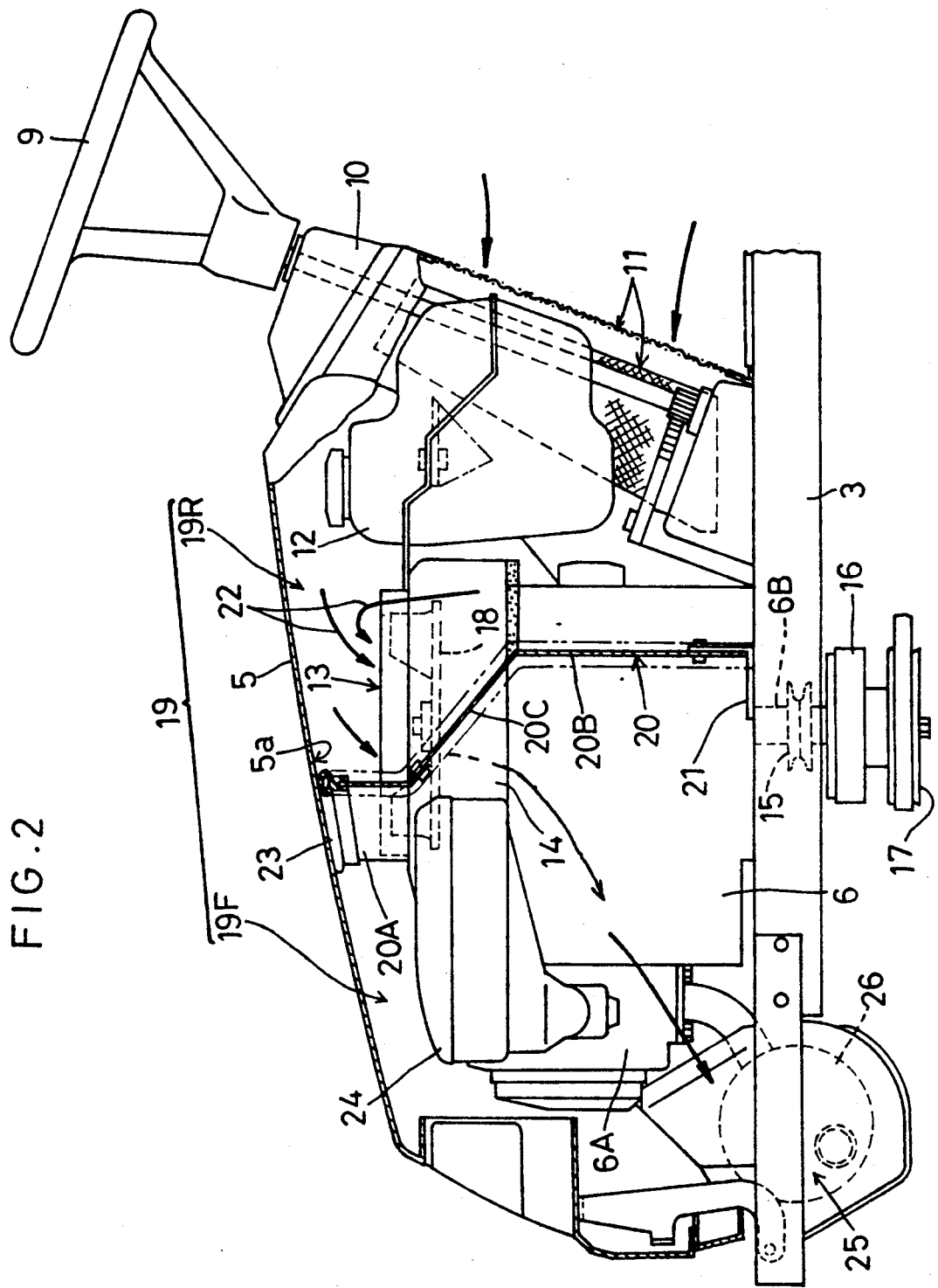
FIG. 2 is a side view, partly broken away, showing an engine room of the lawn mower.

As shown in FIG. 2, the hood 5 is connected to a forward end of the body frame 3 to be pivotable between and open position and a closed position. When the hood 5 is closed, a rear edge of the hood 5 contacts a front edge of the steering box 10. The steering box 10 has an air intake opening 11 formed in a rear and lateral surfaces thereof to draw ambient air for cooling the engine 6. A fuel tank 12 is mounted rearwardly of the engine 6 and adjacent an interior space of the steering box 10. The steering box 10 and hood 5 define an air passage for leading the air drawn through the air intake opening 11 of the steering box 10 to a cooling fan 18 mounted above the engine 6 for forcibly cooling the engine 6.

As shown in FIG. 2, the engine 6 is an air-cooled vertical axis type engine. A cap-like engine cover 14 extends over the engine 6, and this engine cover 14 defines a cooling air suction opening 13 in an upper surface thereof for fitting the cooling fan 18 therein. The engine 6 is mounted on the body frame 3, with a cylinder head 6A projecting forwardly. The engine 6 has a crank shaft or output shaft 6B extending downwardly and carrying a pulley 15 which is a part of a belt transmission mechanism for transmitting engine power to the transmission 7. The output shaft 6B further carries, through an electromagnetic clutch 16, a pulley 17 for driving the grass cutting unit 4.

Figure 3:
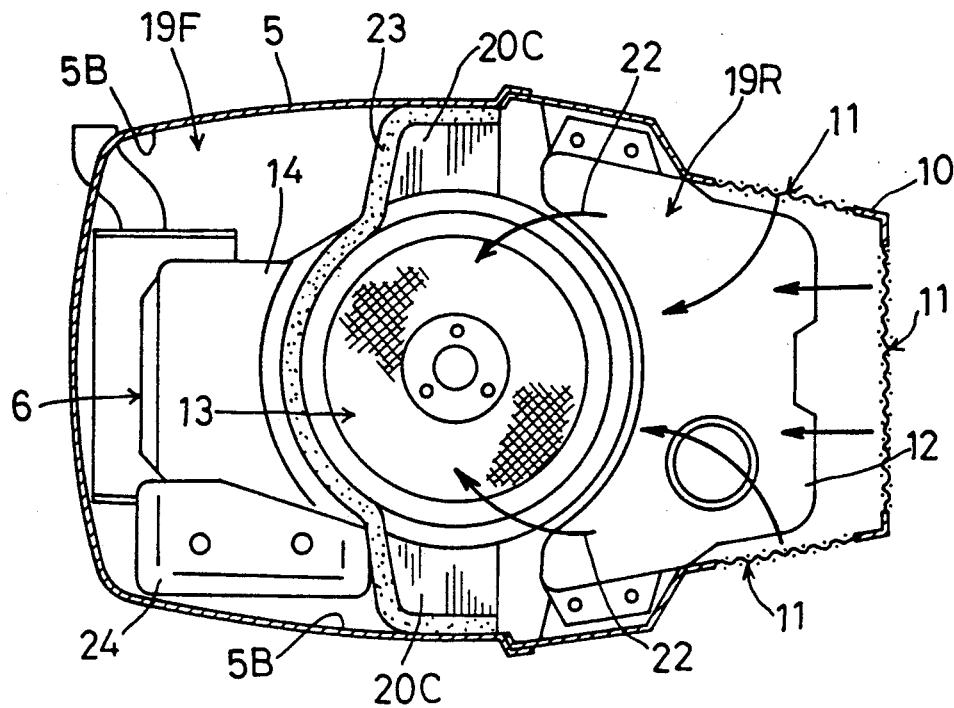
FIG. 3 is a plan view in cross section showing the engine room.

An engine room 19 is defined substantially by the hood 5 and steering box 10. The engine room 19 is divided by a shield 20 into a front chamber 19F accommodating the cylinder head 6A, and a rear chamber 19R accommodating the cooling air suction opening 13. The shield 20 is fixed to the cover 14 of the engine 6 and to the body frame 3. The shield 20 includes a first shield portion 20A fixed to the cover 14 of the engine 6, and second shield portions connected to right and left sides of the first shield portion 20A and bolted at lower positions thereof to L-shaped brackets 21 of the body frame 3. The first shield portion 20A is curved to follow an upper front edge of the cover 14 as shown in FIG. 3, and erected to extend between a ceiling 5a of the hood 5 and an upper position of the engine 6. Each of the second shield portions extends between a lateral inside surface 5B of the hood 5 and a side of the engine 6. As seen from FIG. 2, each second shield portion, when viewed from a side of the vehicle, includes an inclined segment 20C extending rearwardly and downwardly from the first shield portion 20A, and a vertical segment 20B having one end thereof connected to the inclined segment 20C and the other end bolted to the bracket 21. The vertical segment 20B is located slightly rearwardly of the crank shaft 6B toward the steering box 10. However, the vertical segment 20B may be substantially aligned with the crank shaft 6B as viewed from a side of the vehicle. In any case, this construction defines air ducts 22 for guiding cooling air from the cooling air intake opening 11 through the opposite sides of the engine 6 to a position above the engine 6. It will be seen that, for sealing or shock absorbing purposes, an elastic seal 23 is mounted on an outer edge of the shield 20 to contact inside surfaces of the hood 5 in the closed position.

Numeral 24 in FIG. 2 denotes an air cleaner. An exhaust opening 25 is defined in a front position of the body frame 3 for discharging the cooling air from the front chamber 19F of the engine room 19. A muffler 26 is disposed in a region of the exhaust opening 25.

It is possible, when desired, to close a gap between the engine 6 and a lower end of the engine cover 14 lying inside the rear chamber 19R of the engine room 19. Then, the front chamber 19F and rear chamber 19R are completely sealed off and separated from each other.

Figure 4:
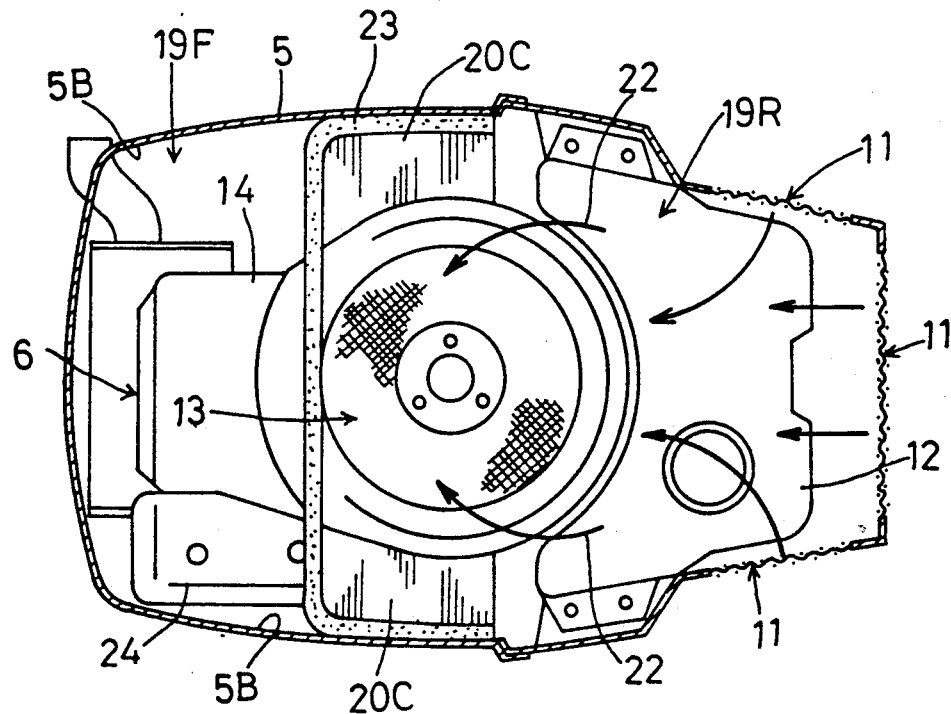
FIG. 4 is a plan view in cross section showing an engine room in a modified cooling system.

In the above embodiment, the first shield portion 20A is curved in plan view. However, as shown in FIG. 4, the first shield portion 20A may have a linear shape extending transversely of the vehicle in plan view.

What is claimed is:

1. In a vehicle having a vertical engine, an air cooling system for the engine, a steering box disposed rearwardly of the engine, and a hood extending from the steering box and over the engine, the engine being mounted on a body frame with a cylinder head projecting forwardly, said air cooling system comprising:
    a cooling fan disposed above said engine,
    an air intake opening defined in said steering box, and
    shield means for dividing an engine room formed forwardly of said steering box and under said hood into a front chamber for accommodating said cylinder head, and a rear chamber for accommodating said cooling fan, said shield means including:
    a first shield member extending from an upper position of said engine to a lower surface of said hood, and
    second shield members connected to opposite ends of said first shield member and extending downwardly between side walls of said engine and side surfaces of said hood, respectively.

2. An air cooling system as defined in claim 1, wherein each of said second shield members includes an inclined segment extending downwardly and rearwardly from said first shield member, and a vertical segment having one end thereof connected to said inclined segment and the other end connected to said body frame.

3. An air cooling system as defined in claim 2, wherein said vertical segment is disposed close to a crank shaft of said engine in a side view, thereby forming a sufficiently large air passage between the side wall of the engine and the side surface of said hood lying in said rear chamber.

4. An air cooling system as defined in claim 3, wherein said rear chamber accommodates a fuel tank.

5. An air cooling system as defined in claim 1, wherein said front chamber includes an air exhaust opening defined in a lower forward position thereof, and a muffler mounted in a region of said air exhaust opening.

6. An air cooling system as defined in claim 1, wherein said first shield member is fixed to said engine.

7. An air cooling system as defined in claim 1, further comprising an elastic seal disposed between said hood and said shield means.

8. In a vehicle having a vertical engine, an air cooling system for the engine, a steering box disposed rearwardly of the engine, and a hood extending from the steering box and over the engine, the engine being mounted on a body frame with a cylinder head projecting forwardly, said air cooling system comprising:
    a cooling fan disposed above said engine,
    an engine cover enclosing said engine and opening downwardly, said engine cover defining an air suction opening in a region opposed to said cooling fan,
    an air intake opening defined in said steering box, and
    shield means for dividing an engine room formed forwardly of said steering box and under said hood into a front chamber for accommodating said cylinder head, and a rear chamber for accommodating said cooling fan, said shield means including:
    a first shield member extending from an upper surface of said engine cover outside said air suction opening to a lower surface of said hood, and
    second shield members connected to opposite ends of said first shield member and extending downwardly between side walls of said engine cover and side surfaces of said hood, respectively.

9. An air cooling system as defined in claim 8, wherein gaps in said rear chamber between lower positions of said engine cover and side walls of said engine are closed.

* * * * *